(12) United States Patent
Häfner

(10) Patent No.: US 6,545,231 B1
(45) Date of Patent: Apr. 8, 2003

(54) CHAIN CONVEYOR

(75) Inventor: Hans Wilhelm Häfner, Aichach-Walchshofen (DE)

(73) Assignee: Pfister GmbH, Augsburg (DE)

( * ) Notice: Subject to any disclaimer, the term of this patent is extended or adjusted under 35 U.S.C. 154(b) by 0 days.

(21) Appl. No.: 09/720,831

(22) PCT Filed: Jun. 30, 1999

(86) PCT No.: PCT/EP99/04514

§ 371 (c)(1),
(2), (4) Date: Dec. 28, 2000

(87) PCT Pub. No.: WO00/00795

PCT Pub. Date: Jan. 6, 2000

(30) Foreign Application Priority Data

Jun. 30, 1998 (DE) .......................... 198 29 036

(51) Int. Cl.⁷ ............................................ G01G 13/02

(52) U.S. Cl. .................... 177/119; 177/145; 222/77; 222/55

(58) Field of Search ................. 177/119, 145, 177/120, 121; 222/55, 56, 77

(56) References Cited

U.S. PATENT DOCUMENTS

| 2,954,969 | A | * | 10/1960 | McCullough et al. ........ 177/145 |
| 3,586,393 | A | * | 6/1971 | Myers .......................... 198/804 |
| 4,114,708 | A | * | 9/1978 | Saner .......................... 177/145 |
| 4,475,669 | A | * | 10/1984 | Wahl ............................ 222/55 |
| 5,119,893 | A | * | 6/1992 | Jost ............................. 177/16 |
| 5,877,456 | A | * | 3/1999 | Homer, III et al. |

FOREIGN PATENT DOCUMENTS

| AU | B-26160/84 | 4/1984 |
| NL | 7905223 | 7/1979 |

* cited by examiner

Primary Examiner—Randy W. Gibson
(74) Attorney, Agent, or Firm—Knobbe, Martens, Olson, & Bear LLP

(57) ABSTRACT

A chain conveyor is provided having a more precise measuring/metering capacity and simpler construction. At least one measuring section, preferably a measuring bridge, is located between the inlet opening and outlet opening of the housing, and is supported by at least one force measuring device. The conveyor chain is guided along the measuring bridge on guiding elements which are fixed at the sides. The measuring bridge may be arranged with flexible intermediate elements such that the bridge is decoupled, resulting in the chain forces being compensated as the force measuring device is impinged upon.

30 Claims, 2 Drawing Sheets

CHAIN CONVEYOR

BACKGROUND OF THE INVENTION

The present invention relates to a chain conveyor.

Such chain conveyors are used in particular to convey bulk materials. In years past such chain conveyors have been used increasingly in basis materials industries (e.g. in coal mining or cement manufacture) to meter or determine the feed rate of bulk materials, since they facilitate a construction which resists wear with high throughput on account of their large abstraction power. In addition a chain conveyor is relatively inexpensive to make and service and can be set up without problem, so that—because of its robust construction—it is suitable as a hopper abstraction unit even for abrasive, coarse grained or sticky bulk materials, as is described in ZKG (Zement-Kalk-Gips [=Cement-Chalk-Gypsum]) No. 7/1993, p. 380.

A disadvantage with the usual structure of a chain conveyor is however that the metering accuracy is relatively poor, since the volumetric filling can be very non-uniform on account of differing densities and also conveyed material can adhere to the conveyor chain connecting the entraining bars during the emptying. Appreciable deviations in respect to the metering accuracy can result from this, which is particularly serious for aggregate mixtures.

Scales combined with belt conveyors or plate conveyors are already known, e.g. according to DE 19 536 871 or DE 4 230 368, wherein the conveyor belt or the plate belt runs over a positionally fixed weighbridge. However, these conveyors have disadvantages in relation to their wear characteristics or the required energy demand, since on the one hand conveyor belts of rubber materials suffer from a lot of wear, even when reinforced, and on the other hand plate belts have a lot of friction, on account of the relative movement between the individual articulated members, especially when heavily loaded.

SUMMARY OF THE INVENTION

The invention is accordingly based on the object of improving the metering accuracy of chain conveyors, with a simple construction.

The support of at least a partial region of a measuring segment, especially of a measuring bridge, on at least one force measuring device, results in precise gravimetric control over the amount of material transported by the chain conveyor. In this way, irregularities such as are unavoidable from differing filling levels in volumetric metering, are reliably avoided and material adhering to conveyor chains and the like can be detected, while the set-point metering amount can accordingly be maintained precisely in the manner of a metering scale with regulated drive. Because of the definite guiding of the conveyor chain in the region of the measuring segment, disrupting forces, e.g. from jamming of granular material between the entraining members and the measuring bridge, can largely be eliminated, so that the measuring segment itself is largely free from external forces, in the manner known from technical mechanics as "isolated", even in the case of very high chain tractive forces. A closed system unit results from guiding the conveyor chain in the region of the measuring segment, where the conveyor chain is securely held down. This can be assisted in a simple way by a slightly peaked form of the measuring bridge, so that a predetermined pre-load on the measuring segment arranged in the tight run results, which reliably avoids lifting of the conveyor chain even with slackening or varying chain tension. Thus problems with unequal feed, such as can occur in the arrangement in the slack run free from tractive force, are likewise reliably avoided.

A particularly simple design of the proposed chain conveyor results in that the measuring bridge of the chain conveyor is pivotally arranged at a defined axis arranged preferably centrally in the plane of circulation of the chain and the weight or force measuring device is spaced from this axis. This arrangement is particularly suitable for retro-fitting of existing chain conveyors in the tight run with guiding of the conveyor chain on the measuring segment, since retro-fitting of the chain conveyor with the gravimetric force measuring device is possible by simple fixing of bolts or other bearings forming the axis, e.g. also of drag-link conveyor apparatuses.

The same applies to movable mounting of only a part of the measuring bridge, which is decoupled by flexible intermediate elements. By interposing flexible intermediate elements, especially composite rubber-and-steel bars or weakening of the material in the manner of a film hinge and support on the measuring device, a simple retro-fitting of existing chain conveyors can be achieved.

A particularly advantageous design has two measuring bridges, where a second tare measuring bridge is arranged before the inlet or hopper feed opening and after the outlet opening, so that the actual discharge amount at the outlet opening can be determined and a tare measurement can thus be effected. The arrangement of two bridge parts, which are connected to one another by a link and act on only a single force measuring device in the manner of a weigh beam, is possible for detecting the chain and entraining member weight in a simple way.

BRIEF DESCRIPTION OF THE DRAWING

Further advantageous arrangements will appear from the following description of embodiments shown in the drawings, in which.

DETAILED DESCRIPTION OF THE INVENTION

Figure 1:
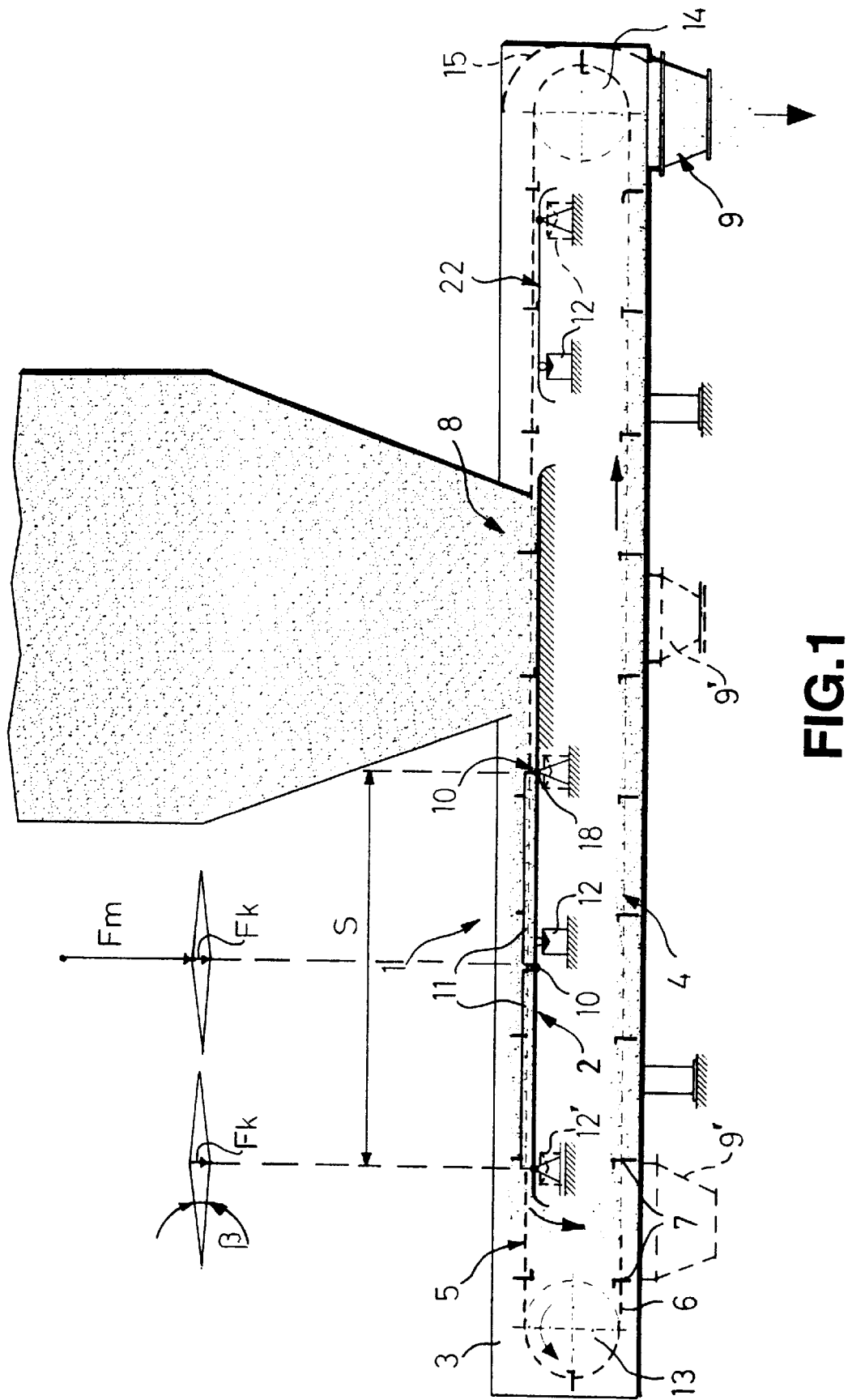
FIG. 1 shows a chain conveyor scale in side view.
Figure 2:
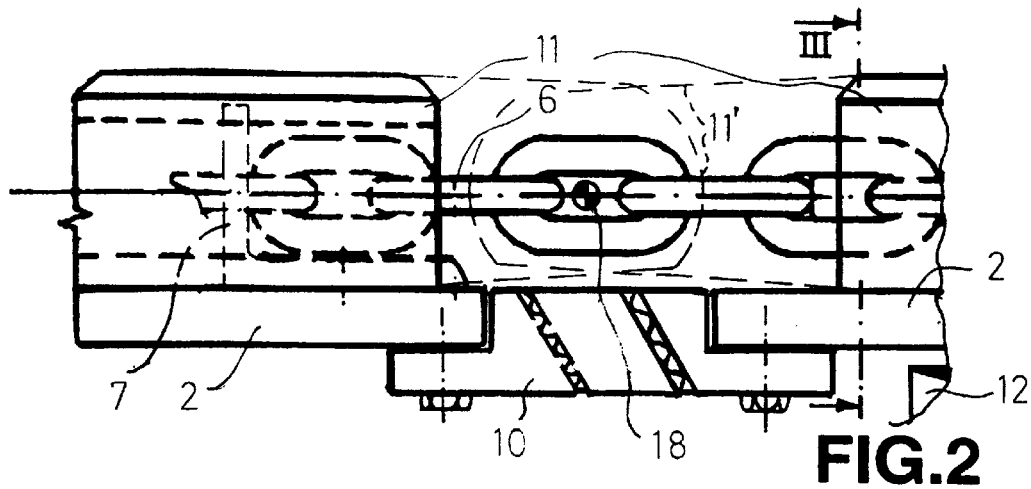
FIG. 2 shows a portion of the chain conveyor according to FIG. 1 in an enlarged side view in the region of the measuring segment.

A chain conveyor 1 is shown in FIGS. 1 and 2 in side view and an associated enlargement in the measuring region respectively, located in a housing or trough 3 and comprising a measuring segment S running in a straight line, which is located in the upper run 5 and is also called the measuring bridge 2 below. A conveyor chain 6 circulates along the measuring bridge 2 in the housing/trough 3 and has entraining bars 7 at regular intervals. Bulk material, which enters the housing 3 from an opening 8 (here from a hopper or silo), is transported by the entraining bars 7 along the measuring bridge 2 in the upper run 5 and then along the lower run 4 to an outlet opening 9, in the counter-clockwise sense, as is shown here by arrows. In between the inlet/filling opening 8 and the outlet opening 9 the plate-like measuring bridge 2 is mounted by means of flexible intermediate elements 10 so as to be movable or slightly yielding or decoupled in the vertical direction, being supported on at least one force measuring device 12 arranged below the measuring bridge 2, especially an approximately centrally arranged load cell. Near to the left end of the measuring bridge 2 a drive 13 is provided in the form of a sprocket wheel which engages in the conveyor chain 6.

After being conveyed along the measuring segment S or measuring bridge 2, the conveyed material (indicated by dots) drops down, overshot in front of the drive 13 on to a wear-resistant bottom plate in the region of the lower run 4 and finally passes through horizontal feed by the conveyor chain 6 and the bar-formed entraining members 7 to the outlet opening 9, where it can fall out under gravity or be blown out. It should be noted that such a blow-out device, not shown, can be arranged in the housing 3, especially with a pressure-tight or dust-tight design of the chain conveyor, so that no disrupting moments can be exerted on the force measuring device 12. In addition cleaning of the chain elements and/or the entraining members 7 can be effected by this, which can be assisted by a reciprocating brush or the like.

The guiding along the housing bend 15 here at the right is also important, since bulk material which has not been ejected can be fed back to a second measuring bridge 22 (likewise with a force measuring device 12) for tare weighing. Any force measuring devices such as shear force transducers or load cells working on an inductive, capacitive or piezoelectric basis can be used as the force measuring device 12 for the measuring bridges 2, 22. A force measuring device 12 is preferred which measures with practically no deflection, especially a strain gauge load cell, since the angle of deflection of the measuring bridge 2 can be restricted to a few minutes of arc by this, so that the circulating movement of the conveyor chain 6 is hardly impeded at all.

A pivotal axis 18 is thus formed by the flexible intermediate elements 10 (see also FIG. 2), about which the measuring bridge parts can deflect slightly like a rocking beam or hinge with straight bridge leaves. These bridge leaves of the measuring segment S are preferably designed slightly peaked or polygonally raised or "cambered", as is shown in exaggerated fashion for clarity by the angle β. The conveyor chain 6 is thus "tensionally" restrained securely from lifting from the measuring segment S and a downwardly directed pre-load or chain force Fk results, which acts on the load cell 12 together with the gravitational force Fm of the bulk material (compare the parallelogram of forces). The chain force Fk acts to same extent on the discharge end of the measuring segment S here at the left and can be measured there by a second load cell 12', so that the effective weight of the conveyed material (=Fm) transported over the measuring segment can be determined by subtraction of this value Fk from the value of the force measuring device 12 (=Fm+Fk). The force measuring device 12, 12' passes the measured value to a computer which computes the instantaneous throughput amount by formation of the product from this together with speed values, such as are obtained from a tachometer on the drive 13 for example. This actual value is preferably compared with a preset set-point value for metering purposes and the controlled drive 13 is regulated in a manner known per se when there are deviations.

Figure 3:
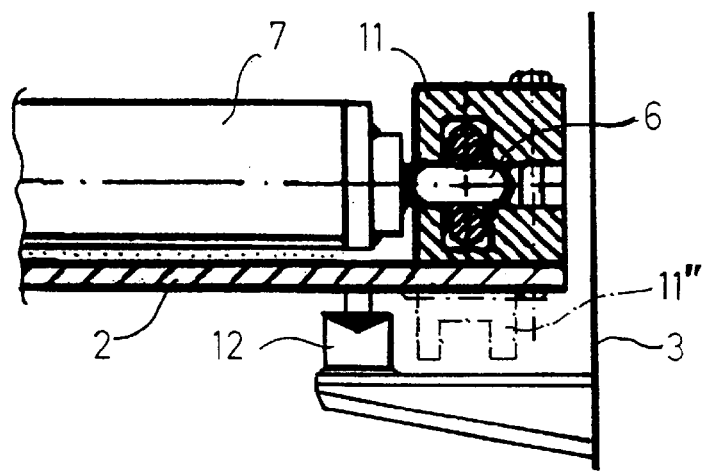
FIG. 3 is cross-sectional view of the side region of the chain conveyor in the region of the measuring segment along the section line III in FIG. 2.
Figure 4:
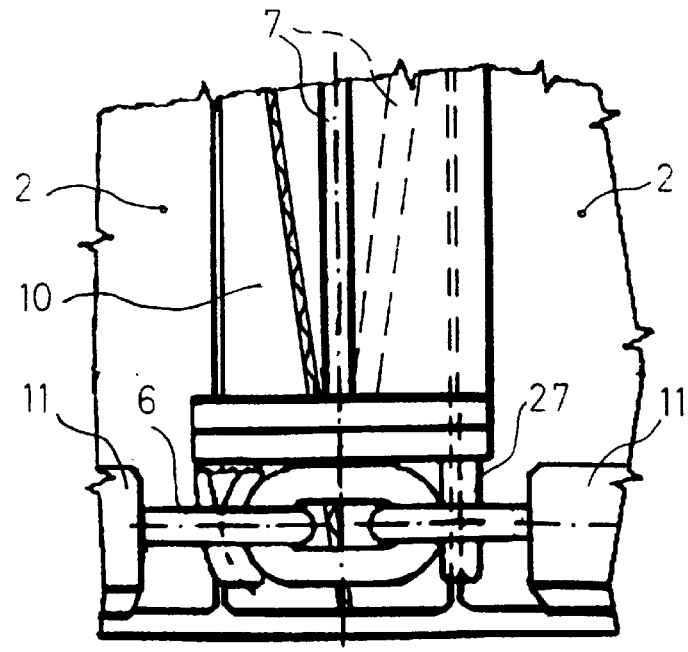
FIG. 4 shows a portion of the measuring segment region of the chain conveyor in plan view.

The side region of the chain conveyor is shown in FIG. 3, wherein the design of the guide elements 11 shown also in FIGS. 1 and 2 for the "positive" retention of the conveyor chain 6 on the measuring segment S can be seen in cross-section. It is essential that the bar-form, slotted guide elements 11 are arranged on the measuring bridge 2, so that excessive chain forces which may occur do not pass into the measuring results or are eliminated. The conveyor chain 6 is thus guided precisely on both sides in the cross-shaped, slotted guide elements 11, while the entraining bar 7 is inserted by means of a forked plug-in entraining element 27 (FIG. 4) inserted in the chain elements standing on edge.

It is possible to dispense with the lateral guide function of the guide elements 11, so that the conveyor chain 6 can for example be prevented from lifting up from the measuring segment S by a smooth bar, while the underside of the conveyor chain 6 can run on a PTFE strip on the measuring bridge 2. Rollers or wheels could also be provided to guide and support the conveyor chain 6 on the measuring segment S, as is shown in FIG. 3 in chain-dotted lines.

The measuring bridge 2 can also be made in one piece, while it can then be supported following short run-in and run-out zones at its end regions (referred to the conveying direction) on four load cells 12', as is indicted in FIG. 1 in broken lines, and the part of the measuring bridge 2 lying towards the hopper is movably mounted by at least one flexible intermediate element 10. In this design also, with four force measuring devices 12 the measuring bridge 2 can move down slightly under the load of the conveyed material during feed of the bulk material and thus act on the two force measuring devices 12 in the manner of weighbridge. After passing the measuring bridge 2 forming the measuring segment S the conveyed material finally reaches the outlet opening 9 and there falls out, down between the entraining bars 7.

As indicated in FIG. 1 in broken lines, the outlet opening 9' can also be arranged below the filling opening 8 or in the vicinity of the drive 13. The second measuring bridge 22 following the outlet opening 9 can also be supported on two force measuring devices 12 or be mounted decoupled on intermediate elements 10. The dead weight of the conveyor chain 6 with the entraining members 7 can accordingly be detected, so that the actual amount of conveyed material arriving at the outlet opening 9 can be determined by forming a difference, by comparing the two measured values of the measuring bridges 2 and 22. If particles of conveyed material should adhere to the entraining bars 7 or the conveyor chain 6, only the amount of bulk material actually leaving the chain conveyor 1 is thus determined. An appreciable increase in the measuring and metering accuracy is possible through this tare measurement. It should be noted that the second measuring bridge 22 can also be arranged in the lower run 4, depending on the position of the outlet opening 9, so that the sag of the conveyor chain 6 and thus the loading of the force measuring devices 12 is the same in each case and thus can be eliminated from the results of measurement.

As shown above, a deflection of the measuring bridge 2 of only an angle of deflection (β) of a few minutes of arc or seconds of arc is involved, so that the circulating movement of the conveyor chain 6 is not impeded. A pivotal bearing with side link plates 11' can also be provided as a flexible intermediate element 10 between the guide elements 11, as is indicated in FIG. 2 in broken lines. The axis 18 thus formed to facilitate the ability of the measuring bridge 2 to pivot (FIG. 2) preferably lies in the plane of circulation of the chain, above the measuring bridge 2. The force measuring device 12 is arranged offset below this, so that a defined lever arm from the axis 18 is obtained. Instead of the link plates/pins other lower friction bearings can be provided to form the axis 18, while the conveyor chain 6 itself can also form a hinge link in its plane of circulation, since the distance between the guide elements 11 preferably amounts to about two or three chain members.

It should be noted that the measured values of the force measuring device(s) 12 are passed to evaluation electronics with a computer in a manner known per se, for calculating the instantaneous feed rate from the measuring bridge loading and the conveyor speed, and they are there compared with adjusted set-point values. By accelerating or braking the drive 13 of the chain conveyor 1, for example by electronic speed regulation, the desired feed or metering amount (feed rate or feed strength) can thus be maintained precisely, even with materials which are relatively difficult to convey, such as clinker or even sludge.

What is claimed is:

1. A chain conveyor for gravimetric measuring or metering, comprising:
   a housing;
   a conveyor chain circulating within said housing;
   entraining members fixed on said conveyor chain;
   an inlet opening in said housing;
   an outlet opening in said housing;
   at least one measuring device;
   a measuring segment arranged between said inlet opening and said outlet opening and supported on at least one said measuring device;
   wherein said chain conveyor is guided positively and/or tensionally on said measuring segment on guide elements fixed to the measuring segment wherein the guide elements are cross-shaped in cross-section.

2. The chain conveyor of claim 1, wherein said measuring segment comprises a measuring bridge, and wherein said measuring bridge is pivotally mounted about an axis.

3. The chain conveyor of claim 2, wherein said measuring device is spaced from the axis.

4. The chain conveyor of claim 2, wherein the axis runs approximately centrally between the measuring bridge parts in the circulation plane of the chain.

5. The chain conveyor of claim 2, wherein said measuring device is arranged at a point of said measuring bridge furthest from said axis.

6. The chain conveyor of claim 2, wherein said measuring device is arranged approximately centrally below said measuring bridge.

7. The chain conveyor of claim 2, wherein said measuring bridge is decoupled relative to the remaining part of said measuring segment by at least one flexible intermediate element.

8. The chain conveyor of claim 1, wherein a second measuring bridge is supported on at least one further measuring device following said outlet opening or a return housing curve, and wherein said measuring devices and said measuring bridges are connected to one another for forming the difference of the measured values.

9. The chain conveyor of claim 8, wherein said measuring bridge parts are supported on a single, common measuring device.

10. The chain conveyor of claim 1, wherein the guide elements are formed by rollers for supporting said conveyor chain.

11. The chain conveyor of claim 1, wherein the guide elements are formed by wheels for supporting said conveyor chain.

12. The chain conveyor of claim 1, wherein said guide elements are pivotally connected in the vertical direction in the region of said axis by link plates.

13. The chain conveyor of claim 1, further comprising a computer coupled to said measuring device, said computer determining the instantaneous conveyed material throughput, forming the product from the weight values of said measuring device and the conveyor speed detected by a speed measuring device at the drive.

14. The chain conveyor of claim 1, further comprising a comparator for comparing the instantaneous conveyed material throughput with a set-point value and a drive control.

15. The chain conveyor of claim 1, wherein the entraining members have an arrow formation between the conveyor chains, and are guided on said guide elements a minimal distance above the measuring device.

16. The chain conveyor of claim 2, wherein said measuring bridge is slightly cambered or peaked and said force measuring device is arranged to detect the chain forces of said conveyor chains.

17. The chain conveyor of claim 2, wherein said measuring bridge is arranged directly adjoining said inlet opening.

18. A method of gravimetric metering or measuring comprising:
   guiding a conveyor chain over a measuring segment supporting at least one measuring device;
   constraining said conveyor chain in the vertical direction as said conveyor chain passes over said measuring segment such that chain forces on said measuring device are controlled wherein constraining comprises passing said conveyor chain through slotted guide elements positioned on said measuring segment.

19. A chain conveyor for gravimetric measuring or metering, comprising:
   a housing;
   a conveyor chain circulating within said housing;
   an inlet opening in said housing;
   entraining members fixed on said conveyor chain;
   an outlet opening in said housing;
   at least one measuring device;
   a measuring segment arranged between said inlet opening and said outlet opening and supported on at least one said measuring device;
   wherein said chain conveyor is guided positively and/or tensionally on said measuring segment on guide elements fixed to the measuring segment wherein said guide elements are pivotally connected in the vertical direction in the region of said axis by link plates.

20. The chain conveyor of claim 19 wherein said measuring segment comprises a measuring bridge, and wherein said measuring bridge is pivotally mounted about an axis.

21. The chain conveyor of claim 20, wherein said measuring device is spaced from the axis.

22. The chain conveyor of claim 20, wherein the axis runs approximately centrally between the measuring bridge parts in the circulation plane of the chain.

23. The chain conveyor of claim 20, wherein said measuring device is arranged at a point of said measuring bridge furthest from said axis.

24. The chain conveyor of claim 20, wherein said measuring device is arranged approximately centrally below said measuring bridge.

25. The chain conveyor of claim 19, wherein said measuring bridge is decoupled relative to the remaining part of said measuring segment by at least one flexible intermediate element.

26. The chain conveyor of claim 19, wherein a second measuring bridge is supported on at least one further measuring device following said outlet opening or a return housing curve, and wherein said measuring devices and said measuring bridges are connected to one another for forming the different of the measured values.

27. The chain conveyor of claim 26, wherein said measuring bridge parts are supported on a single common measuring device.

28. The chain conveyor of claim 19, wherein the guide elements are cross-shaped in cross-section.

29. The chain conveyor of claim 19, wherein the guide elements are formed by rollers for supporting said conveyor chain.

30. The chain conveyor of claim 19, wherein the guide elements are formed by wheels for supporting said conveyor chain.

* * * * *